(12) United States Patent
Wilson

(10) Patent No.: US 9,781,491 B2
(45) Date of Patent: *Oct. 3, 2017

(54) SYSTEMS AND METHODS FOR PROVIDING NON-INTRUSIVE ADVERTISING CONTENT TO SET-TOP BOXES

(71) Applicant: AOL Inc., Dulles, VA (US)

(72) Inventor: Jeffrey Todd Wilson, Ashburn, VA (US)

(73) Assignee: Oath Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,957

(22) Filed: Dec. 2, 2016

(65) Prior Publication Data

US 2017/0085963 A1 Mar. 23, 2017

Related U.S. Application Data

(63) Continuation of application No. 14/554,834, filed on Nov. 26, 2014, now Pat. No. 9,544,659.

(51) Int. Cl.
| | |
|---|---|
| *H04N 7/10* | (2006.01) |
| *H04N 5/445* | (2011.01) |
| *H04N 21/81* | (2011.01) |
| *H04L 29/06* | (2006.01) |
| *H04N 21/234* | (2011.01) |
| *H04N 21/45* | (2011.01) |

(Continued)

(52) U.S. Cl.
CPC ....... *H04N 21/812* (2013.01); *G06Q 30/0257* (2013.01); *G06Q 30/0269* (2013.01); *H04L 65/60* (2013.01); *H04L 67/20* (2013.01); *H04L 67/306* (2013.01); *H04N 21/23424* (2013.01); *H04N 21/25891* (2013.01); *H04N 21/2668* (2013.01); *H04N 21/4316* (2013.01); *H04N 21/44016* (2013.01); *H04N 21/44222* (2013.01); *H04N 21/4532* (2013.01); *H04N 21/472* (2013.01); *H04N 21/8358* (2013.01)

(58) Field of Classification Search
None
See application file for complete search history.

(56) References Cited

U.S. PATENT DOCUMENTS

| | | | | |
|---|---|---|---|---|
| 7,266,832 B2 * | 9/2007 | Miller | ................... | H04H 20/10 |
| | | | | 348/E5.007 |
| 8,051,442 B2 * | 11/2011 | Ergen | ................... | G06Q 30/02 |
| | | | | 725/32 |

(Continued)

*Primary Examiner* — James R Sheleheda
(74) *Attorney, Agent, or Firm* — Bookoff McAndrews, PLLC

(57) ABSTRACT

Systems and methods are disclosed for providing non-intrusive advertising content to users. The method includes receiving user input reflecting user content preferences for receiving desired content related to specific topics in lieu of standard advertising slots while watching playable media content via a set-top box. The method may further include receiving a request for playable media content and then retrieving desired content based on user content preferences. Thereafter, the method may include choosing non-intrusive advertising content and generating datagrams that include the desired content and the non-intrusive advertising content. The datagrams may be concatenated with the playable media content to generate displayable content. The display content may then be provided for displaying.

20 Claims, 9 Drawing Sheets

(51) Int. Cl.
  *H04N 21/442* (2011.01)
  *H04N 21/258* (2011.01)
  *G06Q 30/02* (2012.01)
  *H04N 21/44* (2011.01)
  *H04N 21/431* (2011.01)
  *H04N 21/2668* (2011.01)
  *H04L 29/08* (2006.01)
  *H04N 21/472* (2011.01)
  *H04N 21/8358* (2011.01)

(56) References Cited

U.S. PATENT DOCUMENTS

| | | | |
|---|---|---|---|
| 8,671,423 B1* | 3/2014 | Chang | H04N 21/4126 705/14.4 |
| 9,544,659 B2* | 1/2017 | Wilson | H04N 21/812 |
| 2002/0087402 A1* | 7/2002 | Zustak | G06Q 30/02 705/14.55 |
| 2002/0144262 A1* | 10/2002 | Plotnick | G11B 27/005 725/32 |
| 2002/0194595 A1* | 12/2002 | Miller | H04H 20/10 725/36 |
| 2003/0046690 A1* | 3/2003 | Miller | H04H 20/10 725/36 |
| 2006/0150212 A1* | 7/2006 | Magnussen | H04N 7/17318 725/32 |
| 2007/0061838 A1* | 3/2007 | Grubbs | H04N 7/165 725/35 |
| 2009/0235308 A1* | 9/2009 | Ehlers | H04H 20/106 725/34 |
| 2010/0023960 A1* | 1/2010 | Hasson | H04H 60/63 725/14 |
| 2010/0166389 A1* | 7/2010 | Knee | G11B 27/005 386/241 |
| 2011/0035769 A1* | 2/2011 | Candelore | H04N 7/167 725/32 |
| 2012/0131626 A1* | 5/2012 | Fernandez Gutierrez | H04N 21/4622 725/109 |
| 2013/0326357 A1* | 12/2013 | O'Donnell | G06F 21/60 715/741 |
| 2014/0201785 A1* | 7/2014 | Dharmaji | G06F 15/02 725/34 |
| 2014/0337880 A1* | 11/2014 | Sorbel | H04N 21/812 725/34 |
| 2015/0067714 A1* | 3/2015 | Bhogal | H04N 21/812 725/25 |
| 2015/0070516 A1* | 3/2015 | Shoemake | H04N 21/42203 348/207.11 |
| 2015/0074732 A1* | 3/2015 | Green | H04N 21/2668 725/93 |
| 2015/0154647 A1* | 6/2015 | Suwald | G06Q 30/0269 705/14.66 |
| 2015/0156566 A1* | 6/2015 | Sansom | G06F 17/3082 725/59 |
| 2015/0195598 A1* | 7/2015 | Chang | H04N 7/17318 725/34 |
| 2015/0195615 A1* | 7/2015 | Dharmaji | G06F 15/02 725/34 |
| 2015/0208110 A1* | 7/2015 | Small | H04H 20/82 725/34 |
| 2015/0271417 A1* | 9/2015 | Benabdallah | H04N 5/268 725/59 |
| 2015/0296239 A1* | 10/2015 | Burger | H04H 60/33 725/12 |
| 2016/0066041 A1* | 3/2016 | Fei | H04N 21/252 725/34 |
| 2016/0080792 A1* | 3/2016 | Kosseifi | H04N 21/251 725/34 |

* cited by examiner

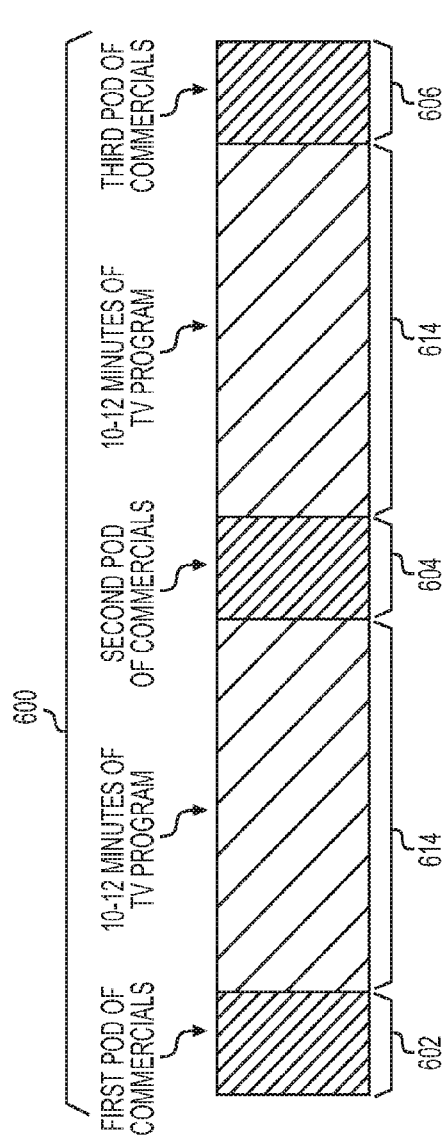
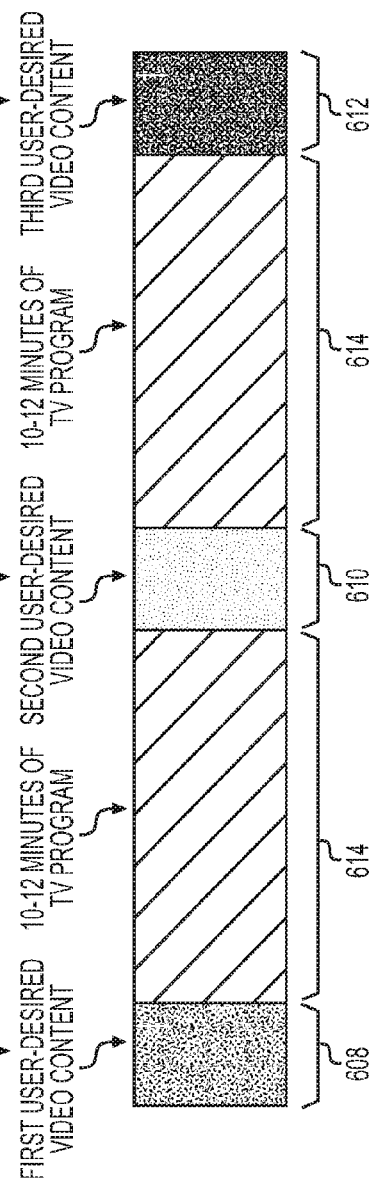

SYSTEMS AND METHODS FOR PROVIDING NON-INTRUSIVE ADVERTISING CONTENT TO SET-TOP BOXES

CROSS-REFERENCE TO RELATED APPLICATION(S)

This application is a continuation of and claims priority to U.S. patent application Ser. No. 14/554,834, filed on Nov. 26, 2014, the entirety of which is incorporated by reference herein.

TECHNICAL FIELD

The present disclosure relates generally to systems and methods for providing playable media content. More particularly, and without limitation, the present disclosure relates to systems and methods for providing non-intrusive advertising content to users.

BACKGROUND

Due to the large population of viewers of video content, such as television, businesses continue to seek more effective means to advertise their goods and services in advertising slots that are included within any playable media content, whether via set-top boxes or online streaming. For content providers, the ability to monetize advertising opportunities while providing video content is an important factor in being able to sustainably provide this content. An important factor for optimal monetization of advertising opportunities in set-top box settings is to ensure high user interaction with any advertising content. One of the challenges with presenting standard advertising slots interspersed within media content, such as a television show, is that, over time, and regardless of the content, users become conditioned to ignore the advertisements. Accordingly, the likelihood that a user will view, listen to, or interact with an advertisement continues to be reduced even for advertisements that may be relevant to the user's interests and/or that they might otherwise find valuable.

One approach to retain target audience attention is to include long advertisements that provide a skip option to users after a pre-determined period of time, forcing a user to at least momentarily focus on the advertised content. Another approach that has been employed is providing any advertising in the advertising slots at a higher volume compared to a volume of the played media content.

Conventional approaches, as mentioned above, may instill a negative user experience. Thus, content providers may wish to provide a positive experience for users, in order to develop and maintain their user base, which may be used to improve advertising revenue over the long term. Embodiments of the current disclosure may provide advertising content in a non-intrusive manner, which allows for positive user interactions with the advertising content, thereby preserving a sustainable user base.

SUMMARY

Various embodiments of the present disclosure relate generally to improving methods for providing non-intrusive advertising. Each of the embodiments disclosed herein may include one or more of the features described in connection with any of the other disclosed embodiments.

The present disclosure includes a computer-implemented method for providing advertising content. One method includes receiving, using at least one processor, user input reflecting user content preferences for receiving desired content related to specific topics in lieu of standard advertising content; receiving a request, from a set-top box, for playable media content; retrieving desired content to include in advertising slots based on user content preferences; choosing non-intrusive advertising content to include along with desired content in a datagram; generating one or more datagrams including the desired content and the non-intrusive advertising content; concatenating the playable media content and the one or more datagrams for generating display content; and providing the display content for display.

The present disclosure also includes systems for providing advertising content, at least one system comprising a data storage device storing instructions; and a processor configured to execute the instructions to perform a method comprising: receiving, using at least one processor, user input reflecting user content preferences for receiving desired content related to specific topics in lieu of standard advertising content; receiving a request, from a set-top box, for playable media content; retrieving desired content to include in advertising slots based on user content preferences; choosing non-intrusive advertising content to include along with desired content in a datagram; generating one or more datagrams including the desired content and the non-intrusive advertising content; concatenating the playable media content and the one or more datagrams for generating display content; and providing the display content for display.

The present disclosure also includes a non-transitory computer-readable medium storing instructions, the instructions, when executed by a computer system causing the computer system to perform a method, the method comprising: receiving, using at least one processor, user input reflecting user content preferences for receiving desired content related to specific topics in lieu of standard advertising content; receiving a request, from a set-top box, for playable media content; retrieving desired content to include in advertising slots based on user content preferences; choosing non-intrusive advertising content to include along with desired content in a datagram; generating one or more datagrams including the desired content and the non-intrusive advertising content; concatenating the playable media content and the one or more datagrams for generating display content; and providing the display content for display.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

FIGS. 6A and 6B are exemplary timelines associated with displayable content, consistent with exemplary embodiments of the present disclosure.

DETAILED DESCRIPTION

Figure 1:
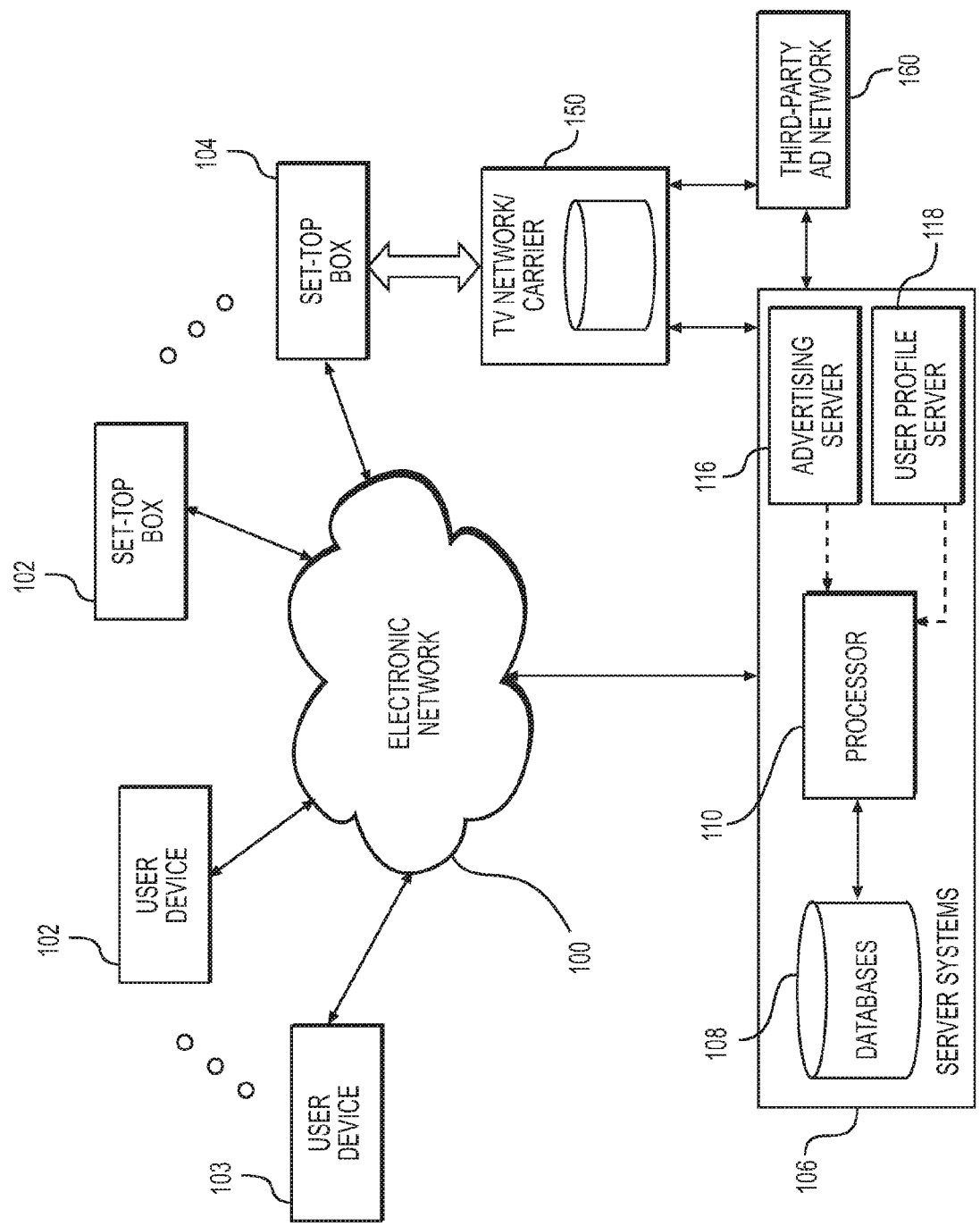
FIG. 1 shows a block diagram of an exemplary online advertising environment for providing non-intrusive advertising content, consistent with exemplary embodiments.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for providing non-intrusive advertising content within video content, such as television. In some embodiments, an exemplary method enables users to select desired content to receive instead of traditional advertising when viewing video content, such as television, associated with their television carrier (e.g., satellite, fiber optic, cable, streaming, and/or other video content providers).

Users may indicate their desired content by interacting with Internet content, televised content, and/or other advertising. For example, a user may select a menu button via a set-top box, a computer, and/or a mobile device to indicate a preference to receive certain content while watching video content (e.g., using a remote control to "like" in real time what they are watching). The user may indicate content preferences to receive desired content, such as sports scores, news highlights, stock updates, weather updates, etc. Further, the user may indicate a preference to be presented certain types of video content over other types of video content. For example, the user may indicate a preference to receive a BMW car advertisement over a Audi car advertisement.

As mentioned above, a user may be subscribed to video content through a satellite, cable, streaming, and/or fiber optic carrier. The satellite, cable, streaming, and/or fiber optic carrier may provide the user with a "set-top box," which may be any type of device that connects the user's television or other display to the respective satellite, cable, streaming, Internet, and/or fiber optic video sources. The set-top box may include a digital video recorder ("DVR"), which includes storage onto which the user may record video content. In one embodiment, the video recording may be provided by a cloud-based and/or virtual DVR that is hosted by a carrier as an alternative to a physical set-top box.

The set-top box may enable a user to select desired content to receive instead of traditional advertising content. For example, as mentioned above, a menu selection option may be presented to a user to allow the user to indicate their preference for viewing desired content based on categories and/or topics instead of otherwise automatically selected video ads (e.g., instead of commercials). The set-top box may also enable a user to select, purchase, and/or view on-demand content, pay-per-view content, and/or any other content, either at no cost or for a fee. In addition, the set-top box may enable a user to add video content to a queue, playlist, and/or "favorites" list. In some cases, a user may be able to log-in to an account associated with their respective carrier, such as through a computer and/or mobile device, using log-in credentials, such as a username and password, stored by the carrier. Thus, the user may be able to enter their preferences regarding desired content and/or record content to their set-top box and/or DVR, select or purchase on-demand or pay-per-view content, and/or add content to a queue, playlist, and/or favorites list, by interacting with the carrier's website and/or with a mobile app distributed by the carrier.

According to aspects of the present disclosure, a user may also be able to record content to their DVR, select or purchase on-demand or pay-per-view content, or add content to a queue, playlist, and/or favorites list, by interacting with Internet content and/or Internet advertising viewed on a computer or mobile device. In other words, a user may be able to request content to a set-top box provided by their carrier by interacting with Internet content and/or advertising promoted by a publisher or advertiser, such as a television network, and/or producer or creator of video content. In one embodiment, a user may be able to perform one or more additional actions, such as by following the advertised content through a social media service.

Thereafter, when a user is viewing playable media content (such as a television show) via the set-top box, and a server attempts to determine content to include in any pre-designated advertising slots, the user may instead be presented with desired content selected based on the user's preferences along with non-intrusive advertising content. The method may include retrieving updated data related to user interests. For example, if a user's desired content includes sports highlights, then recent sports highlights may be retrieved. The exemplary method may further include choosing non-intrusive advertising content from a set of non-intrusive advertising content associated with various potential advertising entities. Non-intrusive advertising content may include items related to advertising entities, such as logos, branding terms, images, thumbnails, etc., that may be included, embedded, or watermarked for presentation in an advertising slot along with a user's desired content.

The combination of a user's desired content along with the secondary advertising content may be used to generate a datagram that may be displayed in any pre-designated advertising slots within media content. Therefore, the combination of desired content and non-intrusive advertising content may serve as a datagram. For example, if a user's previous input indicates a desire to receive sports highlights, a datagram presented within an advertising slot, presented at a later time, may display sports highlights of football games occurring simultaneously or at a particular time frame along with a watermark stating, e.g., "brought to you by Company X." In some embodiments, non-intrusive advertising content may be chosen based on a user profile associated with the user.

In some embodiments, an exemplary user profile may be generated based on user behavior, user demographics, user interests, among other factors. In an exemplary scenario, two users may both request sports highlights. However, a first datagram containing sports scores presented to a forty year old user may contain a logo of a first company targeting a person of his age demographic, while a second datagram presented to a second user who is a teenager, may contain a logo of a second company targeting the teenager demographic. Accordingly, exemplary methods provide an efficient, non-intrusive way of providing advertising content that may be embedded within desired content that may be specific for each user based on their user selection. Since the desired content may be based on a user's own preferences, the user may be more likely to pay attention to and interact with any displayed datagrams throughout their viewing experiences. Such an approach allows an advertising entity to target its audience in a manner that may be likely to create minimal negative reaction from a user. Therefore, exemplary embodiments provide for an advertising approach that may be particularly helpful in aiding an advertising entity in enhancing its general brand recognition or creating positive associations with a particular brand.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of an exemplary network environment in which various user interfaces may display video content, according to an embodiment of the present disclosure. As shown in FIG. 1, the environment may include a plurality of user and/or client devices 102 (referred to hereafter as user devices 102) and a plurality of set-top boxes 104, that are communicatively coupled to each other as well as to a plurality of server systems 106, via an electronic network 100. The environment may also include a plurality of television networks and/or carriers 150, referred to hereafter as carriers 150. The carriers 150 may be communicatively coupled, separately or via electronic network 100, to respective set-top boxes 104 and to the plurality of server systems 106. Third-party advertising networks 160 may also be communicatively coupled, separately or via electronic network 100, to respective carriers 150 and server systems 106. The electronic network 100 may include one or a combination of wired and/or wireless electronic networks. Network 100 may also include a local area network, a medium area network, or a wide area network, such as the Internet.

In one embodiment, each of set-top boxes 104 may be an information appliance device that connects to a display, such as a television set, and an external source of signal, such as a carrier 150. Each of the set-top boxes 104 may be used to translate source signals from a carrier 150 into video content, which may be displayed on a television screen and/or display device. The external source of signal may include the Internet, cable television, satellite television, and over-the air television signals. In embodiments, set-top boxes 104 may be connected to server systems 106 via network 100 allowing each set-top box to receive playable media content and/or generate and/or receive datagrams for displaying to a user. Set-top boxes 104 may contain a memory, at least one processor, decoder, television tuner, television amplifier, in addition to other elements.

In one embodiment, each of user devices 102 may be any type of computing device that is configurable to send and receive different types of content and data to and from various computing devices via network 100. Examples of such a computing device include, but are not limited to, a desktop computer or workstation, a laptop computer, a mobile handset, a personal digital assistant ("PDA"), a cellular telephone, a network appliance, a camera, a smart phone, an enhanced general packet radio service ("EGPRS") mobile phone, a media player, a navigation device, a game console, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user devices 102 may be configured to execute a web browser and/or mobile browser installed for displaying various types of content and data received from any of the server systems 106 via network 100. Server systems 106 in turn may be configured to receive data related to user interaction with the web browsers and/or mobile browsers displayed on the user devices 102. The user interaction may occur at each user device 102 through an interface provided on a web page loaded within the browser executable at each device. It should be noted that server systems 106 may be implemented using a single server device or system or may refer to a combination of multiple servers. Additionally, server systems 106 may contain one or more additional servers such as an advertising server 116 and user profile server 118. Advertising server 116 may be configured to solicit user preferences regarding desired content related to a topic of interest, whether while providing playable media content via a set-top box and/or while a user associated with a set-top is browsing online. Advertising server 116 may also be configured to receive a request to fill any available advertising slots to be interspersed within playable media content that is requested for viewing by a user. In some embodiments, advertising server 116 may provide datagrams to fill the any available advertising slots. Further details with respect to generation of datagrams are provided in the explanation accompanying FIGS. 2-6B. Advertising server 116 may also determine whether a particular user is the target audience for a particular advertisement entity.

In embodiments, user profile server 118 may be configured to generate and/or update a user profile associated with a user, which may be used to determine the secondary advertising content to include in a datagram. An exemplary user profile server may receive a request with a unique identifier, and subsequently check to see if there is any data related to the unique identifier. For each unique identifier, there may be a corresponding user profile that may be used to match a target audience of an advertising entity to users. If there is no user profile that corresponds to the unique identifier, then a new user profile may be created and stored for the unique identifier. The user profile may be used to store data that reflects a user's online activities and/or preferences. If there is a user profile that corresponds to the unique identifier, then the user profile may be updated with data related to the unique identifier. The user profile corresponding to the unique identifier may also be used to determine which secondary advertising content to be used for display to the user associated with the user profile.

As shown in FIG. 1, server systems 106 may include processor 110. While only exemplary processor 110 is shown, server systems 106, including individual servers within server systems 106 may contain one or more additional processors configured to be able to execute some or all of the processes described herein with respect to processor 110. In an embodiment, processor 110 may be configured to provide datagrams and/or non-intrusive advertising content within one or more advertising slots, as will be described in further detail below with respect to FIGS. 2-6B.

In some embodiments, processor 110 may be configured to receive instructions and content from various sources including client devices 102, set-top boxes 104, carriers 150, and/or third-party ad networks 160, and may be configured to store the received content within one or more databases 108. In some embodiments, databases 108 may be any type of data store or recording medium that may be used to store any type of data. For example, databases 108 may store information related to user preferences for receiving desired content related to specific topics. Additionally, databases 108 may store playable media content, metadata associated with playable media content, demographic and metrics of target audiences for advertising, user profile data, advertising content, user-generated content, etc. In some implementations, data may be stored in the databases 108 in an encrypted form to increase security of the data against unauthorized access. Processor 110 and/or any additional processors within server systems 106 may also be configured to provide content to set-top boxes 104 and user devices 102 for display.

The content for display may include, for example, playable media content, such as television shows, that has been processed or received with embedded advertising content. For example, processor 110 may transmit displayable content which included playable media content (such as a television show) interspersed with datagrams (such as desired content of sports scores along with non-intrusive advertising content). In some embodiments, user devices 102 may be used by certain users to input and/or manage content provided by server systems 106. For example, specific metrics regarding the kind of non-intrusive advertising content to provide may be accessed or controlled by an advertising entity, such as third-party ad network 160, using one of the user devices 102.

Figure 2A:
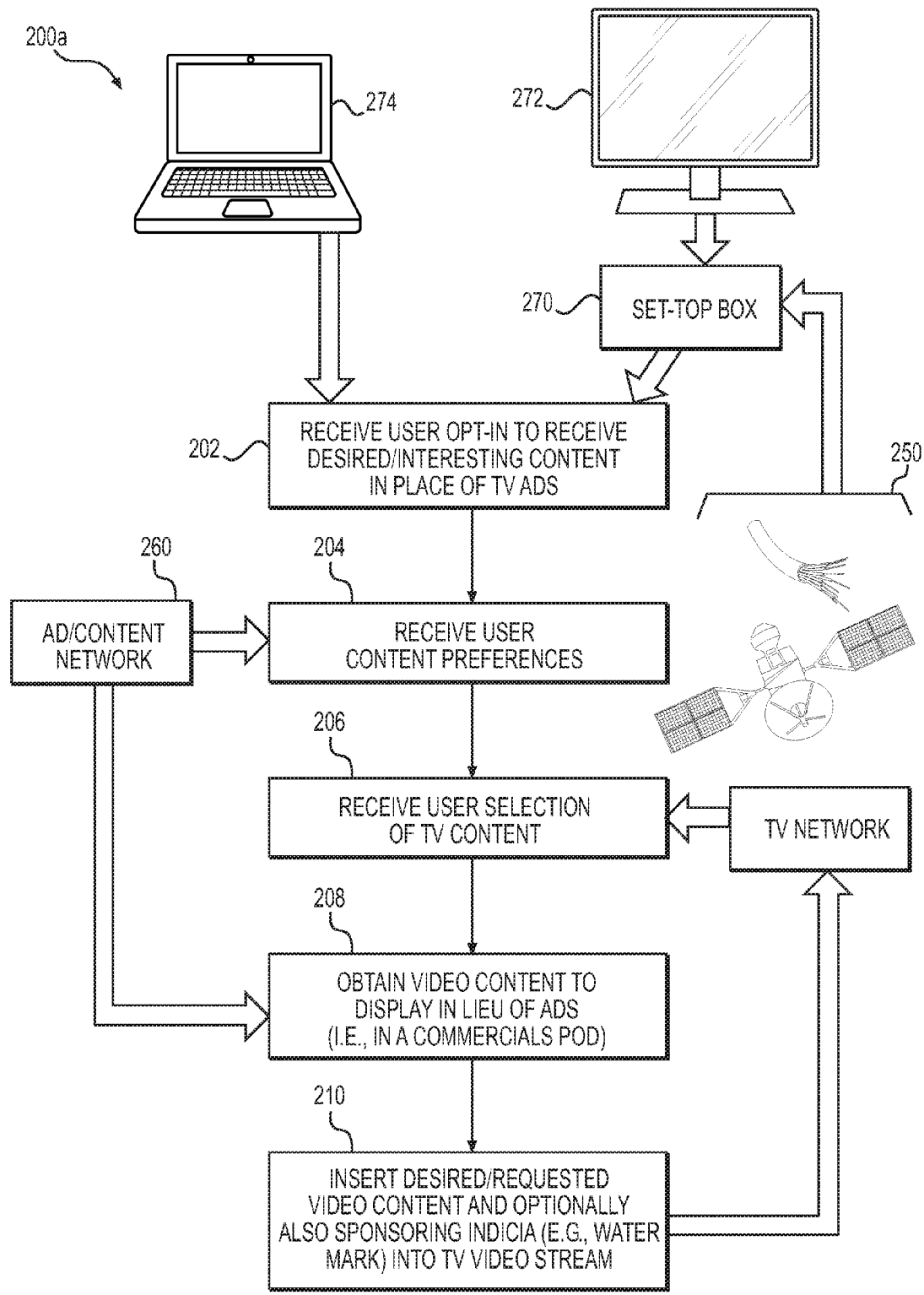
FIGS. 2A and 2B are flow diagrams of exemplary methods for providing non-intrusive advertising content, according to an embodiment of the present disclosure.

FIG. 2A is a flow diagram of a method 200a for providing non-intrusive advertising content, according to an exemplary embodiment of the present disclosure. In further detail, as shown in FIG. 2A, step 202 of method 200a may include receiving a user input from a user at a server, such as server systems 106. The user input of step 202 may be an opt-in to receive desired and/or topics of interest content instead of advertisements. The opt-in may be received via a set-top box 270 connected to display device 272 of the user and/or from a user device 274 of the user.

Upon receiving the opt-in, at step 204, the server may receive user content preferences. The user content preferences may be received from one or more of the user via the set-top box 270, the user device 274, and/or an ad/content network 260, such as third-party ad network 160. In one embodiment, the user opt-in may include content preferences and/or information relating to specific topics of interest that the user may desire to receive in lieu of standard advertising content. For example, the user input of step 202 may be a user-provided opt-in, along with preferences regarding content that the user desires to view/interact with instead of normal advertising content that is typically presented in advertising spaces. The desired content or information related to specific topics may include an indication to receive sports scores, stock market activity, traffic info, weather, etc., as discussed above.

At step 206, the server may receive a user selection of media content, such as a TV program. The selection of video content may be provided to a TV network 250, such as TV network/carrier 150, from set-top box 270, which may then be provided to the server at step 206. The selection of TV content may include content slot information that relates to an available space for advertising.

Then, at step 208, the server may obtain video content to display in lieu of ads based on the content slot information and/or the user content preferences. The video content to display to the user may be obtained from ad/content network 260. Such video content obtained may be displayed in, for example, a commercial pod of the media content, as discussed in further detail below.

Figure 5:
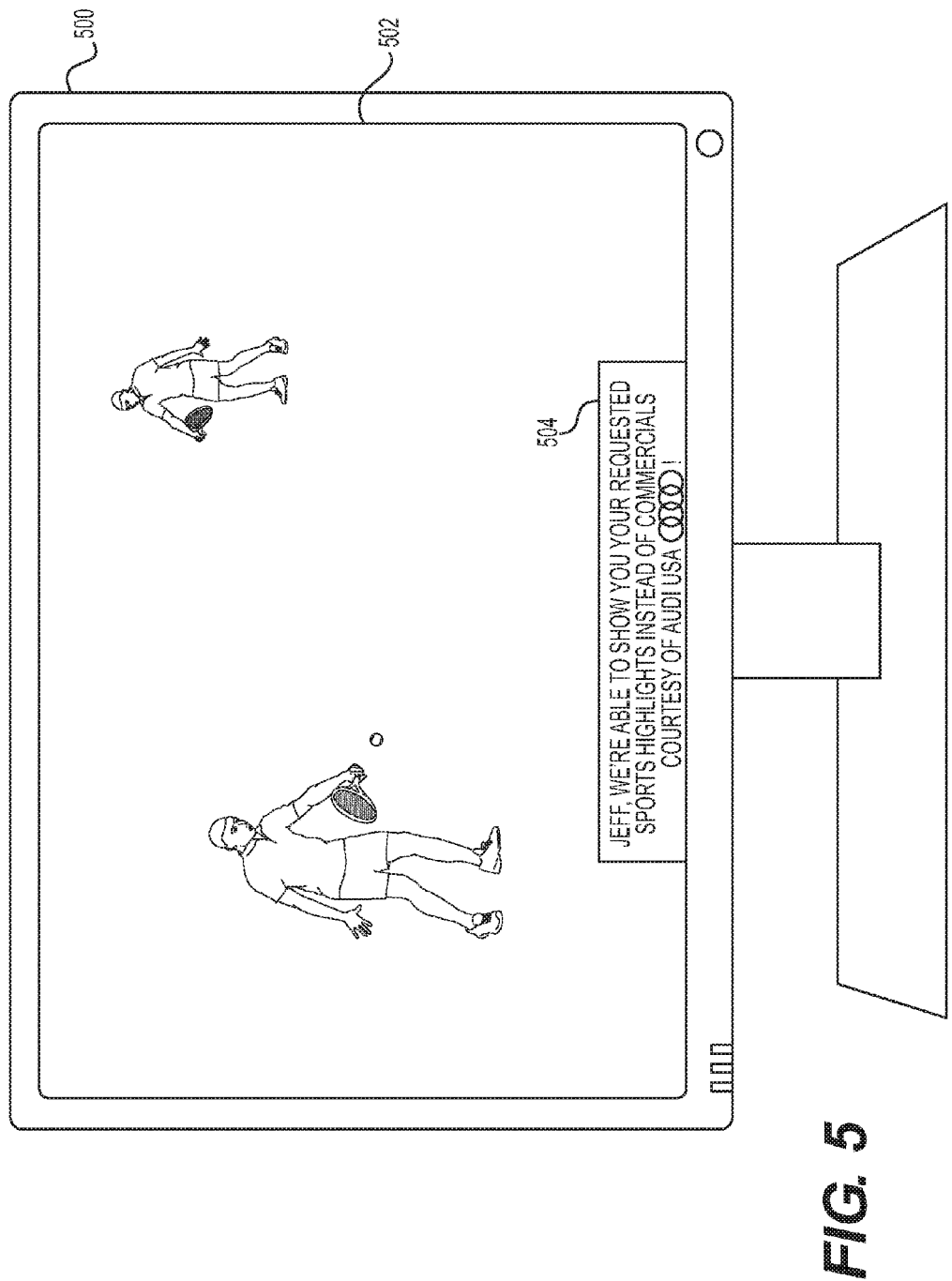
FIG. 5 is an exemplary electronic display device, such as a television, for displaying desired playable media content in lieu of advertising commercials, consistent with exemplary embodiments of the present disclosure.

Upon obtaining video content to display, at step 210 the server may insert the video content into a content slot based on the content slot information. The server may also, optionally, insert sponsoring indicia, e.g., a watermark, into the video content based on the content slot information. Alternatively, or additionally, the video content and/or the sponsoring indicia may be provided to TV network 250 for insertion into the media content and/or a TV video stream. As shown in FIG. 5, a user watching content on display device 500 via a set-top box, such as a set-top box 104, may view a sports highlight 502 with a sponsoring indicia 504 instead of an advertisement.

Figure 2B:
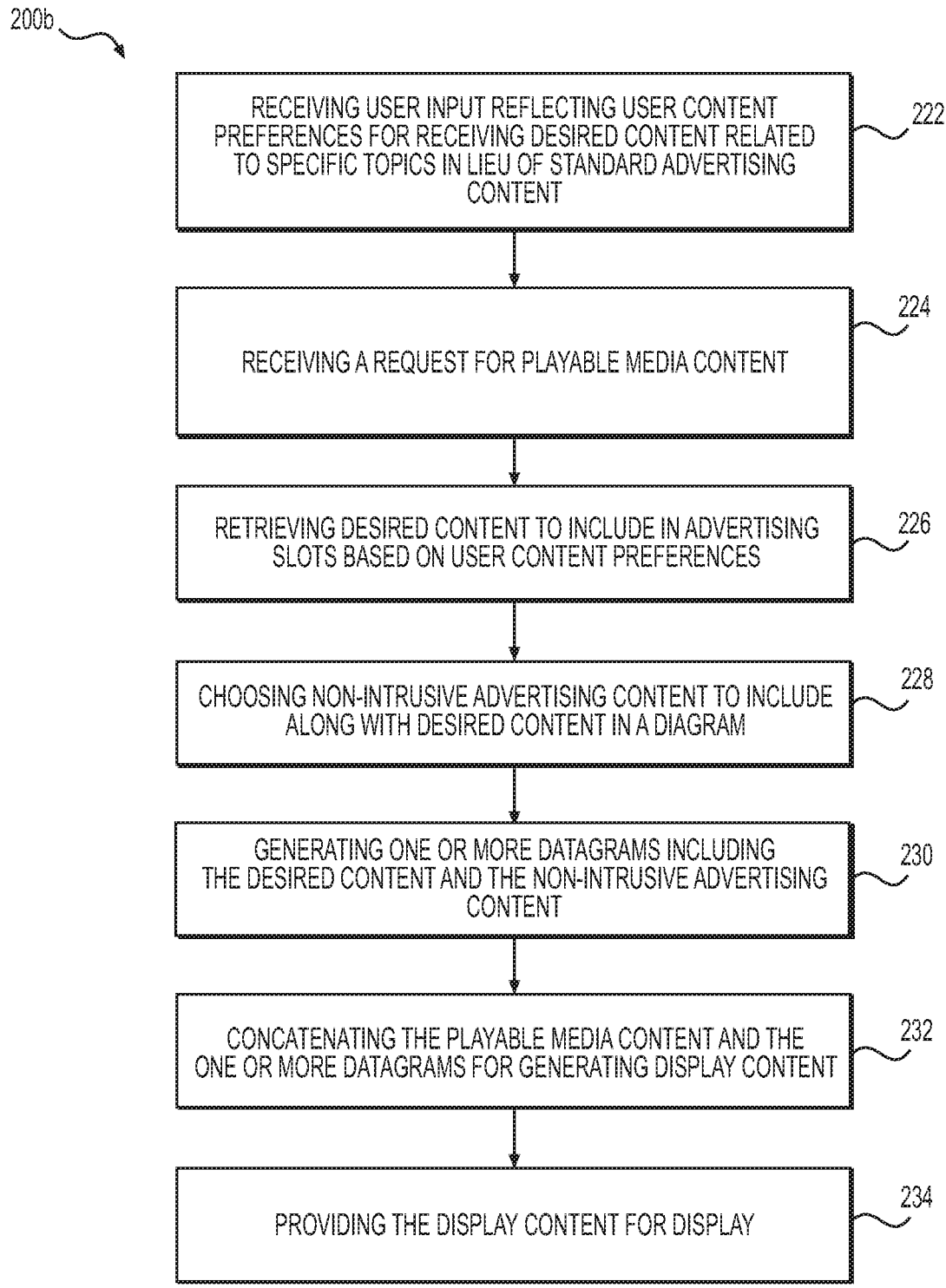

FIG. 2B is another flow diagram of a method 200b for providing non-intrusive advertising content, according to an exemplary embodiment of the present disclosure. FIG. 2B may begin at step 222 in which user input is received that reflects user content preferences for receiving desired content and/or information related to specific topics in lieu of standard advertising content. User input reflecting user content preferences may be specific user-provided opt-in preferences regarding content that they wish to view/interact with instead of normal advertising content that is typically presented in advertising spaces. Accordingly, as will be discussed in further detail below, specific information relating to a user's preferences may be provided in advertising slots in lieu of traditional display ads or sponsored content.

Figure 3A:
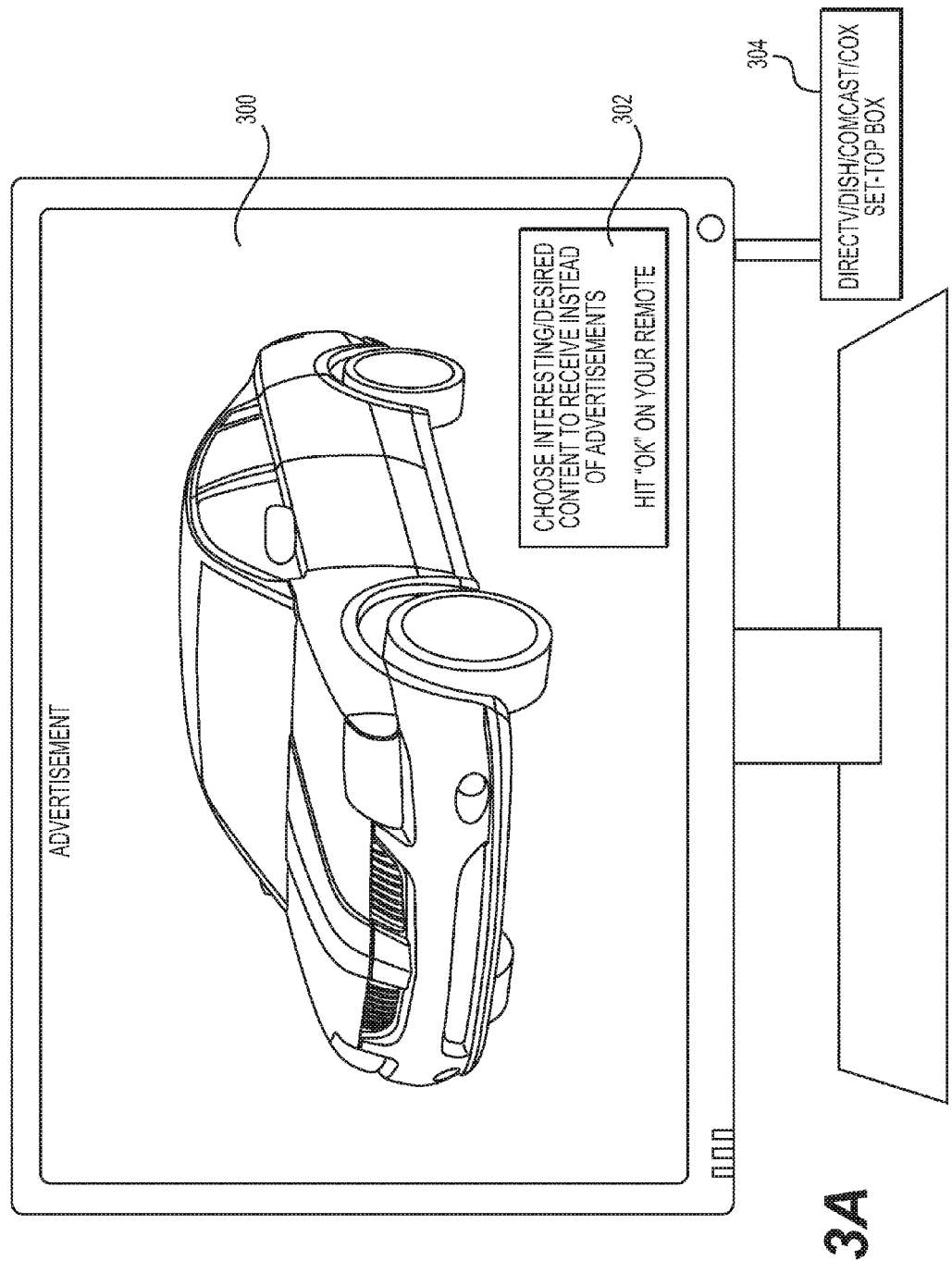
FIGS. 3A and 3B illustrate exemplary graphical user interfaces for providing non-intrusive advertising content, consistent with exemplary embodiments of the present disclosure.
Figure 3B:
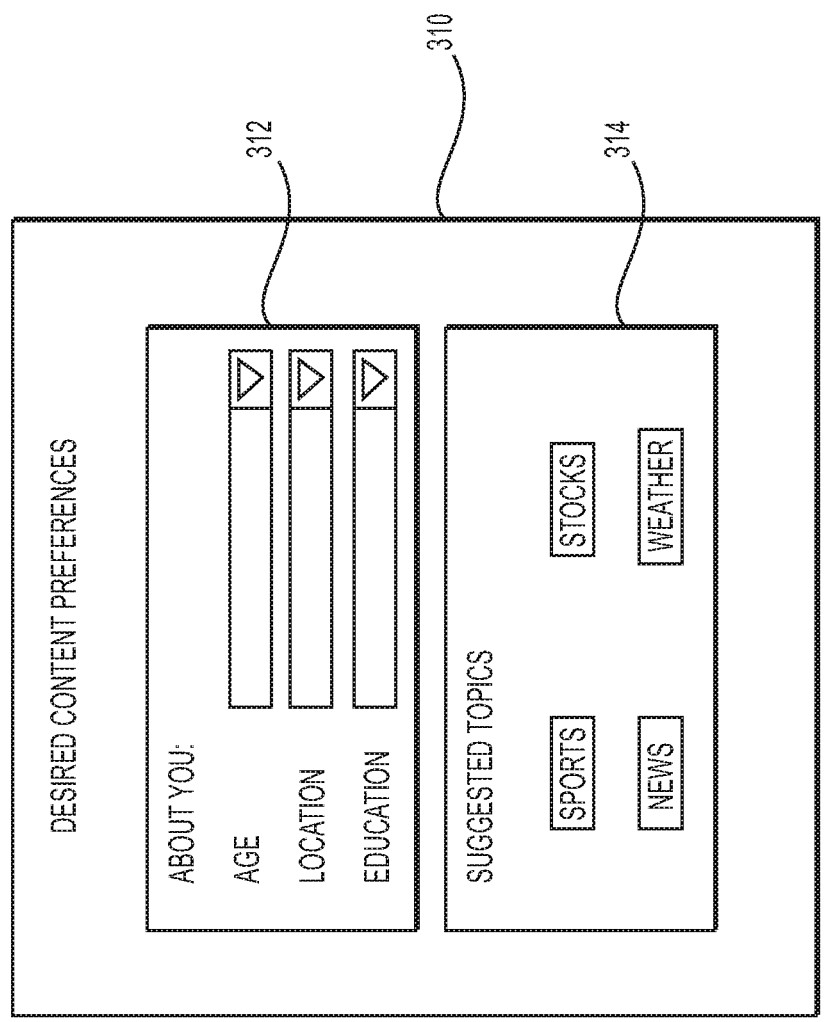

A user may input their content preferences by using numerous exemplary approaches. In some embodiments, a user's preferences regarding desired content instead of standard advertising content may be explicitly solicited while they are viewing content via a set-top box. For example, FIG. 3A depicts an exemplary viewing environment of a display device 300 connected to a set-top box 304 on which video content may be displayed, consistent with exemplary embodiments of the present disclosure. Advertising options banner 302 may allow a user to select a particular type of desired content to receive in advertising slots during transmission of content in lieu of traditional ad content. Advertising options banner 302 may indicate that a user may press a particular button, such as an "OK" on a remote, to select and/or to view options for selecting desired content for advertising slots. By pressing the particular button, such as the "OK" button on the remote (not illustrated), the user may be presented with interface 310, which is illustrated in FIG. 3B. In some cases, a remote control might have option/reuse buttons so it too can signal the set-top box/server that the user has "liked" or otherwise flagged the show/content/story/current material they are viewing as preferable and would like to receive "follow-me" updates going forward.

As shown in FIG. 3B, the interface 310 may allow a user to input content preferences for receiving desired content and/or information related to specific topics, in lieu of standard advertising content. For example, lists of various topics by various categories may be displayed by the selection of advertising options banner 302 (FIG. 3A). A user may simply select a particular topic to indicate their preferences. Exemplary categories may be arranged in various methods. For example, in a sports category, news, stocks, scores, etc., as discussed above, may be presented. Additionally, interface 310 may contain user input section 312 in which a user may input information about themselves. In response, suggested topics of interest to the user may be presented in suggested topics section 314. A user may then select any of the topics that are of interest to them.

In some embodiments, selection of advertising options banner 302 may lead to a display of a notification that a user may log in to a related online account controlled by a content provider and/or a related service provider. The user may then be able to enter their preferences regarding desired content via an online account.

In another exemplary embodiment, a user's preferences regarding desired content instead of standard advertising content may be explicitly solicited while they are browsing online content. For example, a mobile device and/or computer on which a user may be browsing may be associated with the user (or a set-top box associated with the user). Accordingly, during their normal browsing of websites, a display may pop up requesting user preferences regarding desired content in lieu of standard advertising content. It should be appreciated that, if the provider is aware that the user owns/controls the related devices, the preferences set on one device may be used/persist on the (known) related devices.

Figure 4:
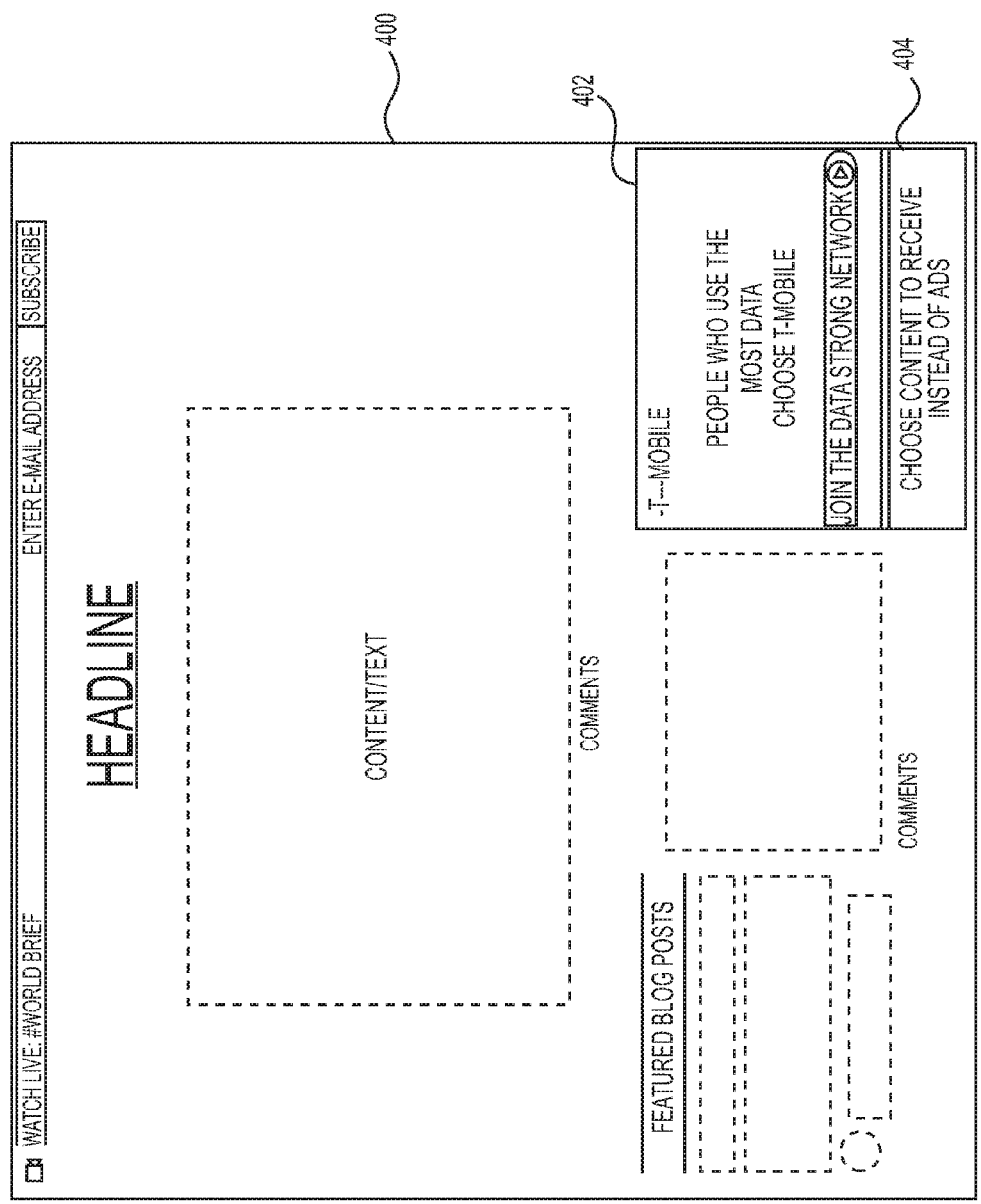
FIG. 4 is an exemplary screenshot of a web page or other graphical user interface for prompting a user to request content in lieu of ads, consistent with exemplary embodiments of the present disclosure.

FIG. 4 depicts an example user interface 400, such as a website, that displays online content. The online content may include any textual, graphical, video, and/or photographic content provided by a publisher of the web page. Moreover, as is consistent with many publisher sites, the web page may also include advertising space 402 by which the publisher may monetize the views or "impressions" of the publisher's online content. As shown in FIG. 4, advertising space 402 may include a traditional advertisement (in this case for a mobile device). However, consistent with embodiments of the present disclosure, advertising space 402 may also be provided along with a banner 404, which indicates that a user may initiate a sequence to request to be shown a particular type of desired content to receive in advertising spaces in lieu of traditional ad content. Specifically, as shown in FIG. 4, the banner 404 may display the prompt: "Choose content to receive instead of ads on TV."

Once a user has elected to click-through banner 404 and established a process for requesting and receiving desired content in lieu of advertising, the user may indeed receive desired content in place of advertising when viewing video content, such as television content, affiliated with a provider of banner 404. For example, FIG. 4 illustrates a scenario in which desired content may be indicated to be displayed in place of advertising on video content. Banner 404 indicates that a user may select particular type of desired content to receive in advertising slots while watching media content on a related set-top box in lieu of traditional ad content. A related set-top box may refer to a set-top box that is registered to the same user or may be operating on the same home network. By selecting banner 404, a user may be presented with a preferences interface, such as the interface 310 as shown in FIG. 3B. The interface may allow a user to input content preferences for receiving desired content or information related to specific topics, in lieu of standard advertising content.

In some embodiments, after selection of advertising options banner 302 or banner 404, a user may simply be able to input specific information related to their interests. For example, lists of various topics by various categories may be displayed by the selection of advertising options banner 302 or banner 404. A user may simply select a particular topic to indicate their preferences. Exemplary categories may be arranged in various methods. For example, in a sports category, news and scores for individual scores may be presented. In such a scenario, a user does not need to input any personal information. Alternatively, a user may be able to type in their interests, and using algorithms known in the art, suggested topics may be provided to a user.

In another exemplary embodiment, users may be enabled to "tag" (e.g., Facebook Like) content that they find of interest while browsing the internet. Such content may be frequently-changing content, related to events, or content of various publisher sites, etc. Accordingly, directly based on user's liking or tagging of content related to a specific topic, users' preferences may be stored regarding what desired content to provide going forth in datagrams in lieu of standard advertising content. In exemplary embodiments, a notification may be provided to a user after they select, tag, or like, content related to a specific topic that in their future TV content watching experiences, datagrams that contain their desired content, as reflected by their actions, may be provided to them in advertising slots in lieu of typical advertising. For example, if a person "likes" or "follows" a particular sport on a social media platform, they may receive a notification that, based on their selection, they will receive datagrams containing information related to that sport in lieu of standard advertising content while watching media content on their set-top boxes. In some embodiments, a user may be provided an option to modify the automatic selection of desired content in datagrams so that they may accurately specify the information that they are interested in. Alternatively, a user may be able to opt-out of receiving datagrams that may be embedded within online content.

Referring back to FIG. 2B, step 224 of method 200b may include receiving a request for playable media content. For example, a user may request on-demand content and/or content that has been recorded, either in a physical set-top box, such as a set-top box 104, and/or a virtual set-top box housed in a server, such as a server system 106. In some embodiments, the request for playable media content may automatically lead to a determination of content of advertising slots to concatenate with the playable media content. For example, when a user requests the display of particular media content (such as a television show), a determination may be made regarding any advertising slots for displaying advertisements with the playable media content.

Step 226 of method 200b may include retrieving desired content to include in advertising slots based on user content preferences. The advertising slots may refer to pre-determined advertising slots where a datagram may be displayed in lieu of typical advertising content. The pre-determined advertising slots may be based on time, may occur at pre-determined instances in video content, in addition to any other methods of determining advertising slots in a show. For example, desired content related to specific topics for which a user has chosen to receive information may be retrieved from databases 108. As an example, for sports scores, primary interest content may entail retrieving latest score updates for a sport. As an additional example, for news related to a specific topic, updated news highlights related to a particular topic may be retrieved from various sources. Therefore, a datagram to be displayed in an advertising slot may provide desired content directly based on user content preferences. FIGS. 6A and 6B provides an exemplary overview of playable media content and advertising slot content.

In an exemplary scenario, exemplary time bar 600 represents a time period for the requested playable media content 614 to be viewed along with a plurality of pods of advertisements, such as first pod of commercials 602, second pod of commercials 604, and third pod of commercials 606, associated with the requested playable media content. As shown in FIG. 6A, the time bar 600 depicts a first advertising slot content (first pod of commercials 602) for viewing advertisements before a first part of playable media content 614 (for example, 10-12 minutes of a TV program), a second advertising slot content (second pod of commercials 604) for viewing advertisements before a second part of the playable media content 614 (for example, another 10-12 of the TV program), and a third advertising slot content (third pod of commercials 606) for viewing advertisements after the second part of the playable media content 614. In another embodiment, more or less advertising slot content may be viewed before, during, and after, the playable media content. In FIG. 6A, the first pod of commercials 602, second pod of commercials 604, and third pod of commercials 606 may be a default advertisement for viewing by a user that has elected not to receive desired content related to specific topics.

As shown in FIG. 6B, the time bar 600 depicts a first advertising slot content (first user-desired video content 608) for viewing user-desired video content before a first part of playable media content 614 (for example, 10-12 minutes of a TV program), a second advertising slot content (second user-desired video content 610) for viewing user-desired video content before a second part of the playable media content 614 (for example, another 10-12 of the TV program), and a third advertising slot content (third user-desired video content 612) for viewing user-desired video content after the second part of the playable media content 614. As mentioned above, in another embodiment, more or less advertising slot content may be viewed before, during, and after, the playable media content. In FIG. 6B, first user-desired video content 608, second user-desired video content 610, and third user-desired video content 612 may be desired content related to specific topics that are presented for display in lieu of the default advertisement, at the specific user's explicit request.

Referring back to FIG. 2B, step 228 of method 200b may include choosing non-intrusive advertising content to include along with desired content in a datagram. As discussed above with regards to FIG. 1, non-intrusive advertising content may include logos, specific marketing phrases, images, thumbnails, etc. The non-intrusive advertising content may be chosen from a set of non-intrusive advertising content based on comparing a user profile associated with a user and demographics of a target audience of an advertising entity. In detail, a user profile of a user may first be generated based on data related to a user. For example, a user profile may be generated within server systems 106 based on data that is associated with the user. Data related to a user may include but is not limited to video content viewing history, video content preferences, device identity associated with a user, demographic data, user behavior, user preferences, specific personal data of the user associated with a client device, etc. Therefore, an exemplary user profile may be based on user behavior along with any additional data that may be available regarding the user (for example, demographic information) associated with user device 102. For the comparison, an advertising entity may provide data related to a targeted audience for advertising content. Then, the user profile of a user associated with a particular client device may be used to determine what secondary advertising content should be provided to the user. For example, demographics of targeted potential customers may be compared with a user profile associated with a user, and based on the similarity, secondary advertising content may be chosen.

In another embodiment, the non-intrusive advertising content may not be chosen based on a user profile but rather may be chosen based on an association of the non-intrusive advertising content with user desired content preferences. That is, each type of desired content may have advertising entities (and related non-intrusive advertising content) associated with it. For example, if a user's preference for desired content is stock information, then the non-intrusive advertising content may be related to financial institutions.

In other embodiments, the non-intrusive advertising content may be based on a combination of user content preferences and a user profile associated with a user. For example, desired content preference for two users may be stock information. In this exemplary scenario, potential non-intrusive advertising content may relate to various advertising entities that are financial institutions. A first institution's target audience may be of a first demographic such as a high-level income group while a second institution's target audience may be of new college graduates. The first user may belong within the high-level income group and the second user may be a teenager. Accordingly, while the same stock information may be included in respective datagrams that are generated for both of the first and the second individuals, the secondary advertising content for a datagram for the first user will be associated with the first financial institution, while the secondary advertising content for a datagram for the second user will be associated with the second financial institution.

As shown at step 230 of FIG. 2B, the method 200b may include generating one or more datagrams including the desired content and the non-intrusive advertising content. The datagram may therefore be playable content that includes both the desired content and the non-intrusive advertising content, as shown in FIG. 5. For example, desired content may be watermarked with non-intrusive advertising content for generating an exemplary datagram. The generated datagram may be served to a user throughout an advertising network in lieu of display ad, whether media content is being viewed via a set-top box or through some other online streaming mechanism.

At step 232, concatenating the playable media content and the one or more datagrams may be performed for generating display content. That is, one or more datagrams of a particular length that fit within advertising slots may be concatenated with the requested playable media content to generate display content. Display content may essentially be a television show concatenated with playable media (datagrams) for displaying to a user via a set-top box. FIG. 6B illustrates an exemplary scenario for concatenating playable media content and advertising slots content. In additional embodiments, many various different datagrams (for various advertising slots) may be concatenated with playable media content. For example, a television show that is fifty minutes long may have ten minutes of advertising slots, each of which is filled by one or more of generated datagrams.

In some cases, a television network/service provider could optionally make datagrams "non-skippable" (vs. traditional ads that could be skippable, etc.). For example, a television network/service provider may communicate to a user that it cannot permit everyone to skip all of the ads because it otherwise would not be able to generate sufficient revenue to fund the production and distribution of the user's programs. Nevertheless, the television network/service provider may understand that users dislike ads, and so, might enable traditional ads to remain skippable (while the non-intrusive "sponsored by" ads will not be skippable). To the user's benefit, though, the non-intrusive ads might only contain content that the user requested, thereby enabling the user to see what he or she wants while enabling the funding of his or her favorite programs.

Step 234 of FIG. 2B depicts providing the display content for display. That is, the display content may be provided to set-top box 104 for displaying. Accordingly, a requested (and potentially recorded) television show that includes the user's desired content in place of traditional advertising slots may be viewed by a user, while providing non-intrusive advertising. In some embodiments, where the display content is concatenated within set-top box 104, the display content may then be provided to a display device for display.

In some embodiments, a user may select to receive additional information related to displayed desired content or the non-intrusive advertising content by selecting certain buttons. This information may be received via a display device connected to set-top box 104 or via user or client device 102 in the form of a message, notification, or interface, etc.

Accordingly, exemplary method 200b aids in providing an efficient, non-intrusive way of providing advertising content that is embedded within desired content. Similar to other non-intrusive brand-building techniques that are used by various entities to advertise, such as sponsoring sports teams and/or stadiums, exemplary methods of non-intrusive advertising may lead to a dual benefit of allowing online content providers to provide positive user experiences to users and of creating positive associations of certain brands for the users. This approach may aid content providers in maintaining maintain a sustained user base and therefore, to be able to generate advertising revenue. At the same time, advertising entities may be able to promote their brand in a more sophisticated manner with better overall impact.

The examples described above with respect to FIGS. 1-6B, or any part(s) or function(s) thereof, may be implemented using hardware, software modules, firmware, tangible computer readable media having instructions stored thereon, or a combination thereof and may be implemented in one or more computer systems or other processing systems.

Figure 7:
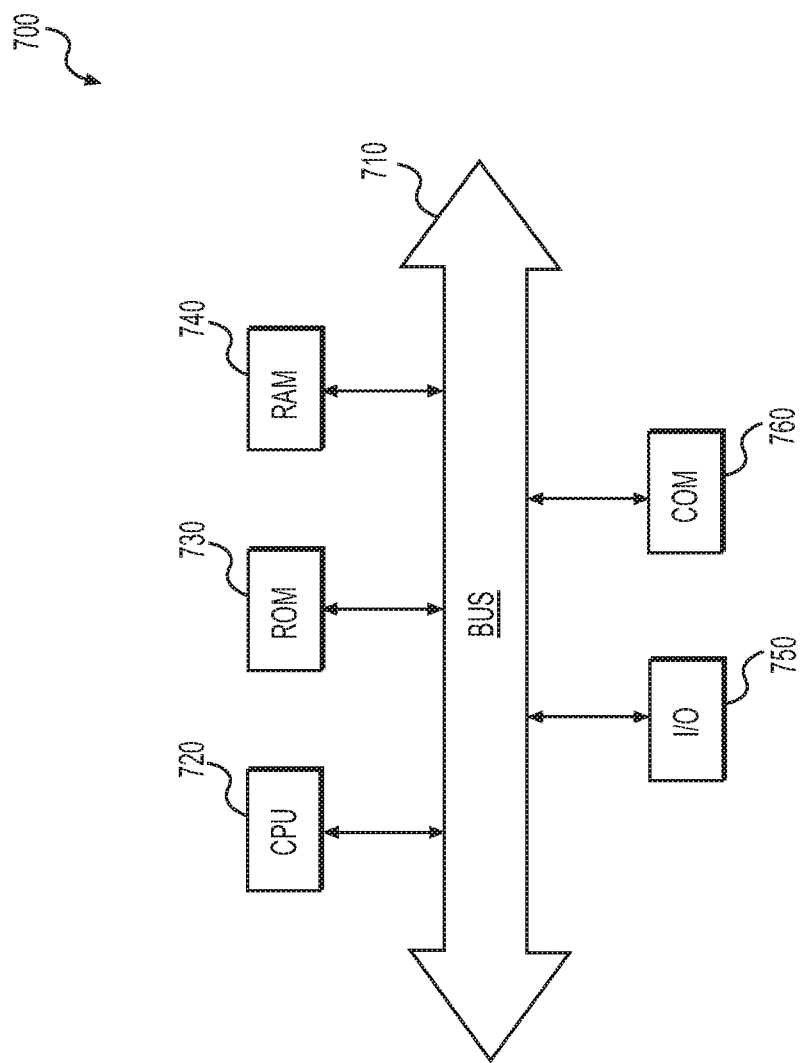
FIG. 7 is a simplified functional block diagram of a computer and/or server that may be configured as a device or system for providing non-intrusive advertising content, according to an exemplary embodiment of the present disclosure.

FIG. 7 illustrates a high-level functional block diagram of an exemplary computer system 700, in which embodiments of the present disclosure, or portions thereof, may be implemented, e.g., as computer-readable code. For example, each of the exemplary devices and systems described above with respect to FIG. 1 can be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-6B may be implemented using computer system 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 7, computer system 700 includes a central processing unit ("CPU") 720. CPU 720 may be any type of processor device including, for example, any type of special purpose or a general-purpose microprocessor device. As will be appreciated by persons skilled in the relevant art, CPU 720 also may be a single processor in a multi-core/multiprocessor system, such system operating alone, or in a cluster of computing devices operating in a cluster or server farm. CPU 720 is connected to a data communication infrastructure 610, for example, a bus, message queue, network, or multi-core message-passing scheme.

Computer system 700 also includes a main memory 740, for example, random access memory ("RAM"), and may also include a secondary memory 730. Secondary memory 730, e.g., a read-only memory ("ROM"), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into computer system 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 700.

Computer system 700 may also include a communications interface ("COM") 760. Communications interface 760 allows software and data to be transferred between computer system 700 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of computer system 700, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

While principles of the current disclosure are described with reference to set-top boxes, it should be understood that the disclosure is not limited thereto. Rather, the systems and methods of the present disclosure may be used in any networked system providing playable media content.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing advertising content, the method comprising:
   receiving, using at least one processor, a user's input reflecting the user's content preferences for receiving desired content in lieu of standard advertising content;
   retrieving desired content to include in advertising slots in lieu of standard advertising content based on the user's input of user content preferences;
   choosing non-intrusive advertising content to include along with the retrieved desired content in a datagram;
   generating one or more datagrams including the retrieved desired content and the chosen non-intrusive advertising content;
   storing the generated one or more datagrams in a database;
   upon receiving, from a set-top box of the user, a request for playable media content, concatenating the playable media content and the previously generated one or more datagrams stored in the database; and
   streaming the playable media content and the one or more datagrams to the set-top box for display to the user.

2. The computer-implemented method of claim 1, wherein the desired content is watermarked with the non-intrusive advertising content to generate the one or more datagrams.

3. The computer-implemented method of claim 1, wherein choosing non-intrusive advertising content to include in the desired content comprises choosing the non-intrusive advertising content to embed in the desired content based on a user profile associated with the user.

4. The computer-implemented method of claim 3, wherein choosing the non-intrusive advertising content to embed in the desired content is further based on a target audience for advertising content.

5. The computer-implemented method of claim 3, wherein:
   the user profile is based on one or more of a unique identity associated with the set-top box, a unique identify associated with the user, user demographic data, and user preferences.

6. The computer-implemented method of claim 3, wherein:
   the user profile is based on the user's interaction with Internet content or Internet advertising viewed on a computer or mobile device.

7. The computer-implemented method of claim 1, further comprising:
   transmitting a message to a user for soliciting user input reflecting user content preferences for receiving the desired content related to specific topics in lieu of standard advertising content.

8. A system for providing advertising content, the system comprising:
   a data storage device storing instructions; and
   a processor configured to execute the instructions to perform a method comprising:
   receiving a user's input reflecting the user's content preferences for receiving desired content in lieu of standard advertising content;
   retrieving desired content to include in advertising slots in lieu of standard advertising content based on the user's input of user content preferences;
   choosing non-intrusive advertising content to include along with the retrieved desired content in a datagram;

generating one or more datagrams including the retrieved desired content and the chosen non-intrusive advertising content;

storing the generated one or more datagrams in a database;

upon receiving, from a set-top box of the user, a request for playable media content, concatenating the playable media content and the previously generated one or more datagrams stored in the database; and streaming the playable media content and the one or more datagrams to the set-top box for display to the user.

9. The system of claim 8, wherein the desired content is watermarked with the non-intrusive advertising content to generate the one or more datagrams.

10. The system of claim 9, wherein choosing non-intrusive advertising content to include in the desired content comprises choosing the non-intrusive advertising content to embed in the desired content based on a user profile associated with the user.

11. The computer-implemented method of claim 10, wherein choosing the non-intrusive advertising content to embed in the desired content is further based on a target audience for advertising content.

12. The system of claim 10, wherein:

the user profile is further based on one or more of a unique identity associated with the set-top box, a unique identify associated with the user, user demographic data, and user preferences.

13. The system of claim 10, wherein:

the user profile is based on the user's interaction with Internet content or Internet advertising viewed on a computer or mobile device.

14. The system of claim 8, wherein the method further comprises:

transmitting a message to a user for soliciting user input reflecting user content preferences for receiving the desired content related to specific topics in lieu of standard advertising content.

15. A non-transitory computer-readable medium storing instructions, the instructions, when executed by a computer system cause the computer system to perform a method, the method comprising:

receiving, using at least one processor, a user's input reflecting the user's content preferences for receiving desired content in lieu of standard advertising content;

retrieving desired content to include in advertising slots in lieu of standard advertising content based on the user's input of user content preferences;

choosing non-intrusive advertising content to include along with the retrieved desired content in a datagram;

generating one or more datagrams including the retrieved desired content and the chosen non-intrusive advertising content;

storing the generated one or more datagrams in a database;

upon receiving, from a set-top box of the user, a request for playable media content, concatenating the playable media content and the previously generated one or more datagrams stored in the database; and streaming the playable media content and the one or more datagrams to the set-top box for display to the user.

16. The computer-implemented method of claim 15, wherein the desired content is watermarked with the non-intrusive advertising content to generate the one or more datagrams.

17. The computer-implemented method of claim 15, wherein choosing non-intrusive advertising content to include in the desired content comprises choosing the non-intrusive advertising content to embed in the desired content based on a user profile associated with the user.

18. The computer-implemented method of claim 17, wherein choosing the non-intrusive advertising content to embed in the desired content is further based on a target audience for advertising content.

19. The computer-implemented method of claim 17, wherein:

the user profile is based on one or more of a unique identity associated with the set-top box, a unique identify associated with the user, user demographic data, and user preferences.

20. The computer-implemented method of claim 17, wherein:

the user profile is based on the user's interaction with Internet content or Internet advertising viewed on a computer or mobile device.

* * * * *